United States Patent
Idota et al.

(10) Patent No.: US 10,923,292 B2
(45) Date of Patent: Feb. 16, 2021

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomoki Idota, Mie (JP); Ryouya Okamoto, Mie (JP); Hiroshi Shimizu, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 127 days.

(21) Appl. No.: 16/323,428

(22) PCT Filed: Jul. 24, 2017

(86) PCT No.: PCT/JP2017/026630
§ 371 (c)(1),
(2) Date: Feb. 5, 2019

(87) PCT Pub. No.: WO2018/030131
PCT Pub. Date: Feb. 15, 2018

(65) Prior Publication Data
US 2019/0355527 A1    Nov. 21, 2019

(30) Foreign Application Priority Data

Aug. 9, 2016  (JP) .................. 2016-156610

(51) Int. Cl.
*H01G 11/10*    (2013.01)
*H01M 2/20*    (2006.01)

(52) U.S. Cl.
CPC .............. *H01G 11/10* (2013.01); *H01M 2/20* (2013.01)

(58) Field of Classification Search
CPC ................................ H01G 11/10; H01M 2/20
See application file for complete search history.

(56) References Cited

U.S. PATENT DOCUMENTS

2012/0164509 A1    6/2012 Ogasawara et al.
2012/0295485 A1*  11/2012 Ikeda .................. H01M 2/1077
                                                    439/626

(Continued)

FOREIGN PATENT DOCUMENTS

JP    2011-077031    4/2011
JP    2013-097962    5/2013

(Continued)

OTHER PUBLICATIONS

Official Communication issued in International Bureau of WIPO Patent Application No. PCT/JP2017/026630, dated Sep. 12, 2017.

*Primary Examiner* — Jimmy Vo
(74) *Attorney, Agent, or Firm* — Greenblum & Bernstein, P.L.C.

(57) ABSTRACT

Provided is a wiring module configured to be attached to a plurality of power storage elements that are arranged side-by-side, the wiring module including a plurality of electric wires, and a plurality of coupling units in which the plurality of electric wires are routed. A left coupling unit of the plurality of coupling units has a left routing portion in which at least one of the plurality of electric wires is routed, and a center coupling unit adjacent to the left coupling unit of the plurality of coupling units has a center routing portion in which at least one of the plurality of electric wires is routed.

(Continued)

The left routing portion is provided with a left engagement portion, and the center routing portion is provided with a center engagement receiving portion that engages with the left engagement portion.

8 Claims, 8 Drawing Sheets

(56) References Cited

U.S. PATENT DOCUMENTS

2013/0178091 A1 7/2013 Ogasawara et al.
2014/0329136 A1 11/2014 Kinoshita et al.
2015/0125727 A1 5/2015 Lui et al.

FOREIGN PATENT DOCUMENTS

JP 2013-161749 8/2013
JP 2014-107161 6/2014

* cited by examiner

WIRING MODULE

TECHNICAL FIELD

The technique disclosed in the present specification relates to a wiring module.

BACKGROUND ART

As a wiring module that is attached to a plurality of batteries that are arranged side-by-side, a wiring module disclosed in Patent Document 1 is known. This wiring module has voltage detection terminals that are connected to the electrodes of the batteries, detection electric wires that are connected to the voltage detection terminals, and an insulation protector in which the detection electric wires are routed. The insulation protector is configured by coupling to ta plurality of coupling units.

Each coupling unit has an electric wire housing groove for housing the detection electric wires. When coupling units are coupled, the electric wire accommodation grooves that are formed in the coupling units are also coupled with each other.

Each coupling unit includes an engagement portion and an engaged portion. The plurality of coupling units are to be coupled by fitting a fitting piece of one coupling unit and a fitting recessed portion of another coupling unit that is arranged adjacent thereto. The fitting piece extends along a coupling direction in which the plurality of coupling units are coupled. Also, the fitting recessed portion is provided at a position corresponding to the fitting piece of the one coupling unit that is arranged adjacent thereto and the fitting piece is fitted therein. The fitting piece and the fitting recessed portion are provided at positions of the coupling unit that are different from the position of the electric wire accommodation groove.

CITATION LIST

Patent Documents

Patent Document 1: JP 2013-97962A

SUMMARY OF INVENTION

Technical Problem

However, with the above configuration, a space for providing the fitting piece that extends from the one coupling unit to another coupling unit and the fitting recessed portion for internally fitting this fitting piece need to be provided in each coupling unit. Also, the fitting piece and the fitting recessed portion are provided at positions that are different from the position of the electric wire routing groove. Accordingly, due to the space for providing the fitting piece and the fitting recessed portion, there is a concern that the routing space of the detection electric wires may be insufficient in the coupling unit.

The technique disclosed in the present specification was completed based on the above circumstances, and it is an object of the invention to secure a routing space for an electric wire in a wiring module.

Solution to Problem

The technique disclosed in the present specification is a wiring module configured to be attached to a plurality of power storage elements that are arranged side-by-side, the wiring module including a plurality of electric wires and a plurality of coupling units in which the plurality of electric wires are routed, a first coupling unit of the plurality of coupling units having a first routing portion in which at least one of the plurality of electric wires is routed, a second coupling unit adjacent to the first coupling unit of the plurality of coupling units having a second routing portion in which at least one of the plurality of electric wires is routed, an engagement portion being provided on one of the first routing portion and the second routing portion, an engagement receiving portion that engages with the engagement portion being provided on the other of the first routing portion and the second routing portion, and the plurality of coupling units being coupled in a state where the engagement portion and the engagement receiving portion are engaged with each other.

With the above configuration, because a first engagement portion and a second engagement receiving portion for coupling the first coupling unit and the second coupling unit are respectively provided on the first routing portion and the second routing portion, the routing space of the electric wires in the wiring module can be sufficiently secured, compared to a case where an engagement portion and an engagement receiving portion are provided at positions different from the position of a routing portion.

The following modes are preferable as embodiments of the technique disclosed in the present specification.

It is preferable that the first routing portion has a groove shape and has a first bottom wall, and one of the engagement portion and the engagement receiving portion is provided on the first bottom wall, the second routing portion has a groove shape and has a second bottom wall, and the other of the engagement portion and the engagement receiving portion is provided on the second bottom wall.

With the above mode, an increase in the height dimension in the up-down direction of the routing space of the electric wires can be suppressed.

It is preferable that the engagement portion and the engagement receiving portion overlap in the thickness direction of the first bottom wall and the second bottom wall in a state where the first coupling unit and the second coupling unit are coupled.

With the above mode, an increase in the height dimension in the vertical direction of the routing space of the electric wires can be further suppressed.

It is preferable that a first cover that covers a first opening portion provided in the first coupling unit is provided on the first coupling unit via a first hinge portion, a second cover that covers a second opening portion provided in the second coupling unit is provided on the second coupling unit via a second hinge portion, a unit lock portion is provided on at least one of the first cover and the second cover, a unit lock receiving portion that engages with the unit lock portion in a state where the first cover covers the first opening portion is provided on the second coupling unit if the unit lock portion is provided on the first cover, and a unit lock receiving portion that engages with the unit lock portion in a state where the second cover covers the second opening portion is provided on the first coupling unit if the unit lock portion is provided on the second cover.

With the above configuration, the first coupling unit and the second coupling unit that are coupled by the engagement portion and the engagement receiving portion can be further double locked by the first cover and the second cover. As a result, the first coupling unit and the second coupling unit can be reliably coupled.

Advantageous Effects of Invention

According to the technique disclosed in the present specification, a routing space of electric wires in a wiring module can be secured.

DESCRIPTION OF EMBODIMENTS

First Embodiment

A first embodiment of the technique disclosed in the present specification will be described with reference to FIGS. 1 to 8. A power storage module 10 according to the present embodiment is installed in a vehicle (not shown) such as an electric car, a hybrid car, or the like, and is used as a power supply for driving the vehicle. The power storage module 10 has a power storage element group 13 in which a plurality of power storage elements 12 each including positive and negative electrode terminals (not shown) are arranged side by side. The plurality of electrode terminals are electrically connected by a wiring module 20 (see FIG. 1).

Note that, in the following description, description will be given with a Z direction as upward, a Y direction as forward, and an X direction as rightward. Also, regarding a plurality of identical members, one member is denoted by a reference numeral and the other members are not denoted by reference numerals in some cases.

Power storage element 12

Figure 1:
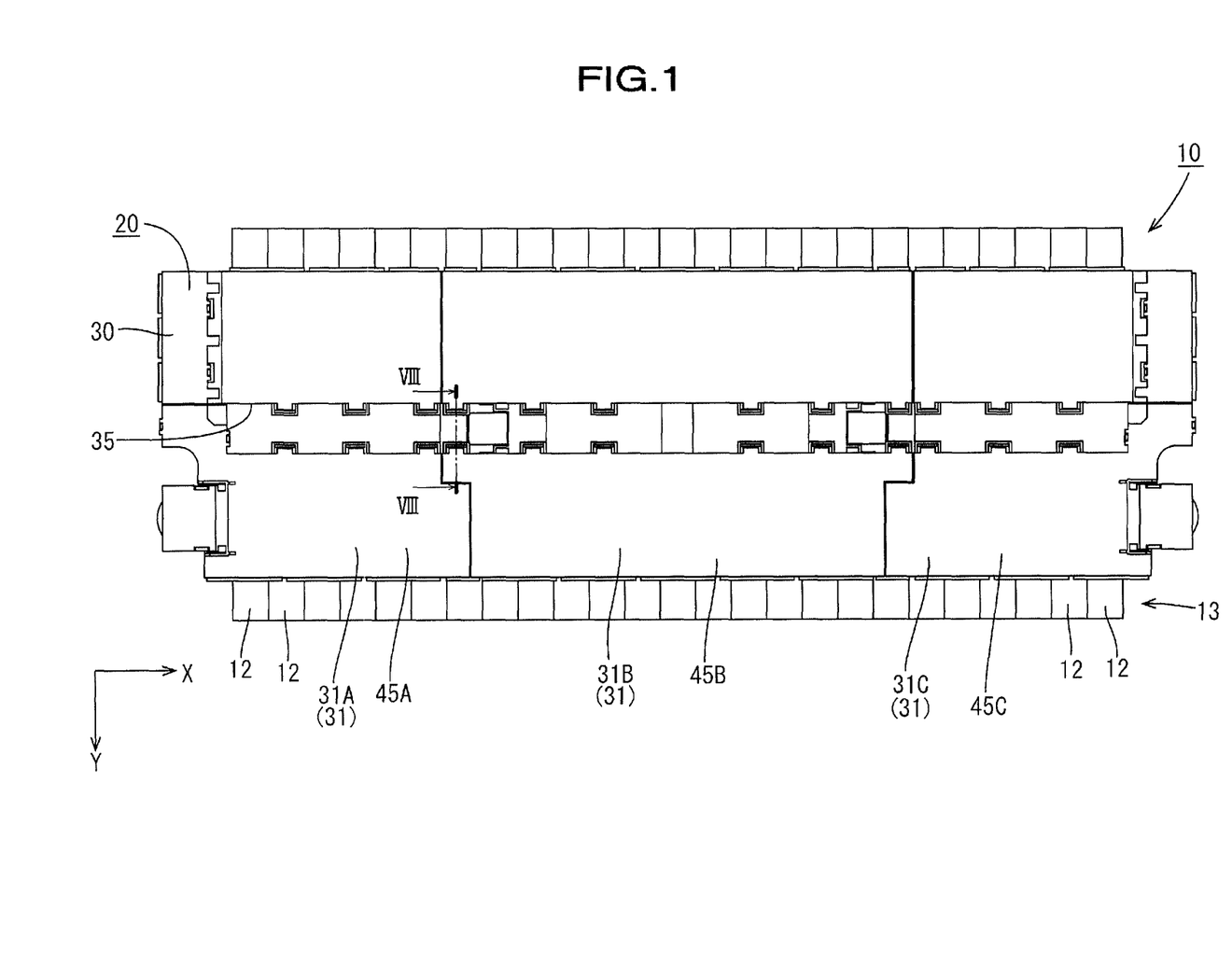
FIG. 1 is a plan view of a power storage module according to a first embodiment.

As shown in FIG. 1, each power storage element 12 has a flat, substantially rectangular parallelepiped shape. A power generating element (not shown) is housed inside of the power storage element 12. A pair of electrode terminals (not shown) are formed protruding upward at positions near both end portions in the lengthwise direction on the upper surface of the power storage element 12. One of the electrode terminals is a positive electrode terminal and the other is a negative electrode terminal. The electrode terminal constituting the positive electrode terminal and the electrode terminal constituting the negative electrode terminal have the same shape and size. The electrode terminals include electrode posts (not shown) that protrude in the form of round columns upward from terminal platforms (not shown) made of metal, and a screw thread is formed in the outer surfaces of the electrode posts. The power storage elements 12 are arranged such that adjacent electrode terminals have different polarities. The plurality of power storage elements 12 are arranged side by side in the left-right direction in the drawing to form the power storage element group 13.

Wiring module 20

Figure 2:
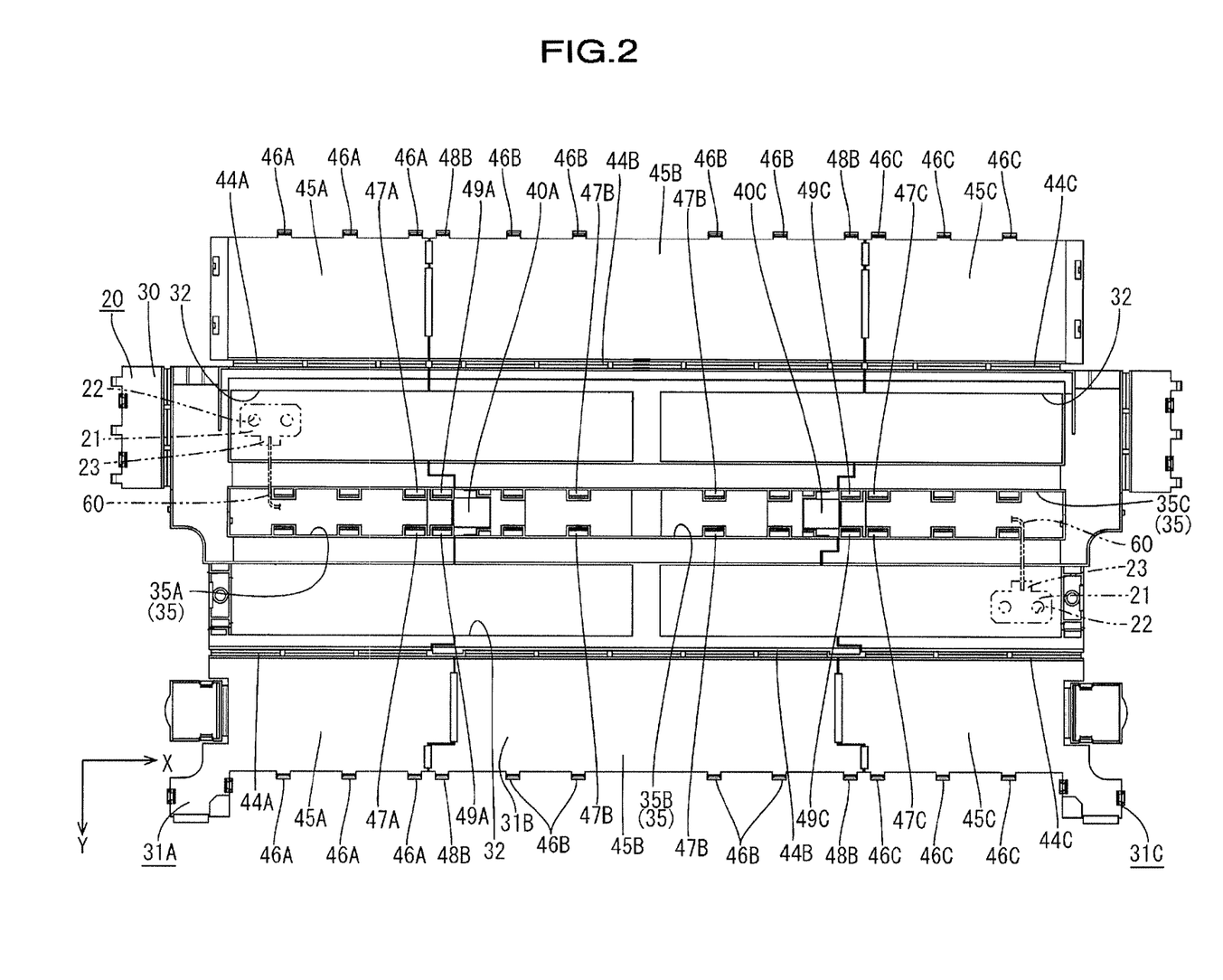
FIG. 2 is a plan view of a wiring module in a state where a left cover, a center cover, and a right cover are open.

As shown in FIG. 2, the wiring module 20 includes a plurality of bus bars 21 made of metal that each include a pair of terminal through holes 22 into which the electrode posts of the positive and negative electrode terminals of the power storage element 12 are respectively inserted and connected, and a plurality of coupling units 31 that hold the bus bars 21. Note that, in FIG. 2, two bus bars 21 are shown and the other bus bars 21 are omitted.

Bus bar 21

The bus bar 21 is formed by pressing a plate material made of metal composed of copper, a copper alloy, stainless steel (SUS), aluminum, or the like into a predetermined shape, and as shown in FIG. 2, the bus bar 21 has an approximately rectangular shape overall. The surface of the bus bar 21 may be plated with a metal such as tin or nickel. In the bus bar 21, a pair of terminal through holes 22 and 22 that have circular shapes and into which the electrode posts of the electrode terminals are to be inserted are formed passing through the bus bar 21. The terminal through holes 22 are set to be slightly larger than the diameter of the electrode posts. Nuts (not shown) are screwed onto the electrode posts in a state where the electrode posts pass through the terminal through holes 22, and the electrode terminals and the bus bar 21 are electrically connected due to the bus bar 21 being sandwiched between the nuts and the terminal platforms.

Each bus bar 21 has a pair of long sides. An electric wire connection portion 23 protruding outward is provided on one long side of the pair of long sides. The end portions of electric wires 60 are connected to the electric wire connection portions 23. In this manner, the bus bars 21 and the electric wires 60 are electrically connected. The electric wires 60 are voltage detection wires for detecting voltages of the power storage elements 12. The electric wire connection portions 23 and the electric wires 60 can be connected by a known method such as crimping, pressure welding, ultrasonic welding, laser welding, resistance welding, or the like.

Coupling unit 31

A resin protector 30 is configured by a plurality of coupling units 31 being coupled in a coupling direction (X axis direction in the present embodiment). The resin protector 30 has an elongated shape in the left-right direction. In each coupling unit 31, as shown in the plan view of FIG. 2, holding portions 32 (an example of an opening portion) that are open upward and house and hold the bus bars 21 and routing portions 35 that house the electric wires 60 connected to the bus bars 21 are provided along the longitudinal direction of the resin protector 30. Each holding portion 32 is formed to be open in the vertical direction. In this manner, the bus bar 21 and the terminal platform of the power storage element 12 can be brought into contact with each other below the bus bar 21, and a nut can be screwed onto the electrode post from above the bus bar 21. Although not shown in detail, in the holding portions 32, a plurality of bus bars 21 are arranged in the left-right direction and held in a state insulated with each other.

The coupling unit 31 includes a left coupling unit 31A (an example of a first coupling unit) that is arranged in the left end portion in FIG. 2, a right coupling unit 31C (an example of the first coupling unit) that is arranged in the right end portion, and a center coupling unit 31B (an example of a second coupling unit) that is arranged between the left coupling unit 31A and the right coupling unit 31C. In the following description, in the case where the left coupling unit 31A, the center coupling unit 31B, and the right coupling unit 31C are collectively described, they may be described as the coupling units 31.

The routing portion 35 provided on the left coupling unit 31A is a left routing portion 35A (an example of a first routing portion), the routing portion 35 provided on the right coupling unit 31C is a right routing portion 35C (an example of the first routing portion), and the routing portion 35 provided on the center coupling unit 31B is a center routing portion 35B (an example of a second routing portion). In the following description, in the case where the left routing portion 35A, the center routing portion 35B, and the right routing portion 35C are collectively described, they may be described as the routing portions 35.

The routing portion 35 is provided along the arrangement direction (left-right direction) of the holding portions 32. By coupling the plurality of coupling units 31, the routing portions 35 formed in the coupling units 31 are coupled to each other.

The left routing portion 35A of the left coupling unit 31A has a left bottom wall 34A (an example of a first bottom wall) and side walls 33A formed to rise from both side edges of the left bottom wall 34A. The right routing portion 35C of the right coupling unit 31C has a right bottom wall 34C (an example of the first bottom wall) and side walls 33C formed to rise from both side edges of the right bottom wall 34C. The center routing portion 35B of the center coupling unit 31B has a center bottom wall 34B (an example of the first bottom wall) and side walls 33B formed to rise from both side edges of the center bottom wall 34B.

Left coupling unit 31A and center coupling unit 31B

Figure 3:
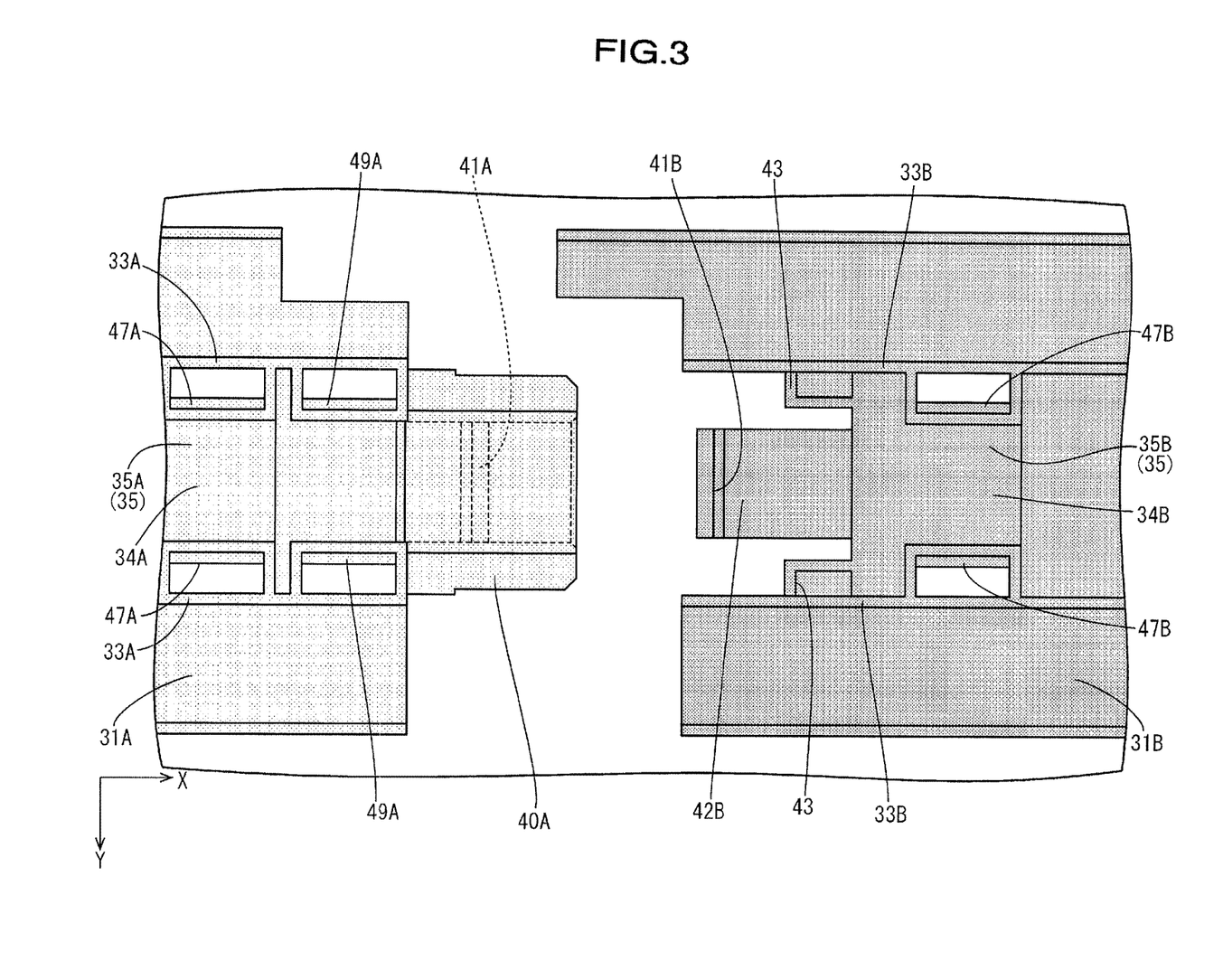
FIG. 3 is a partially enlarged plan view showing a state before connecting a left coupling unit and a center coupling unit.
Figure 4:
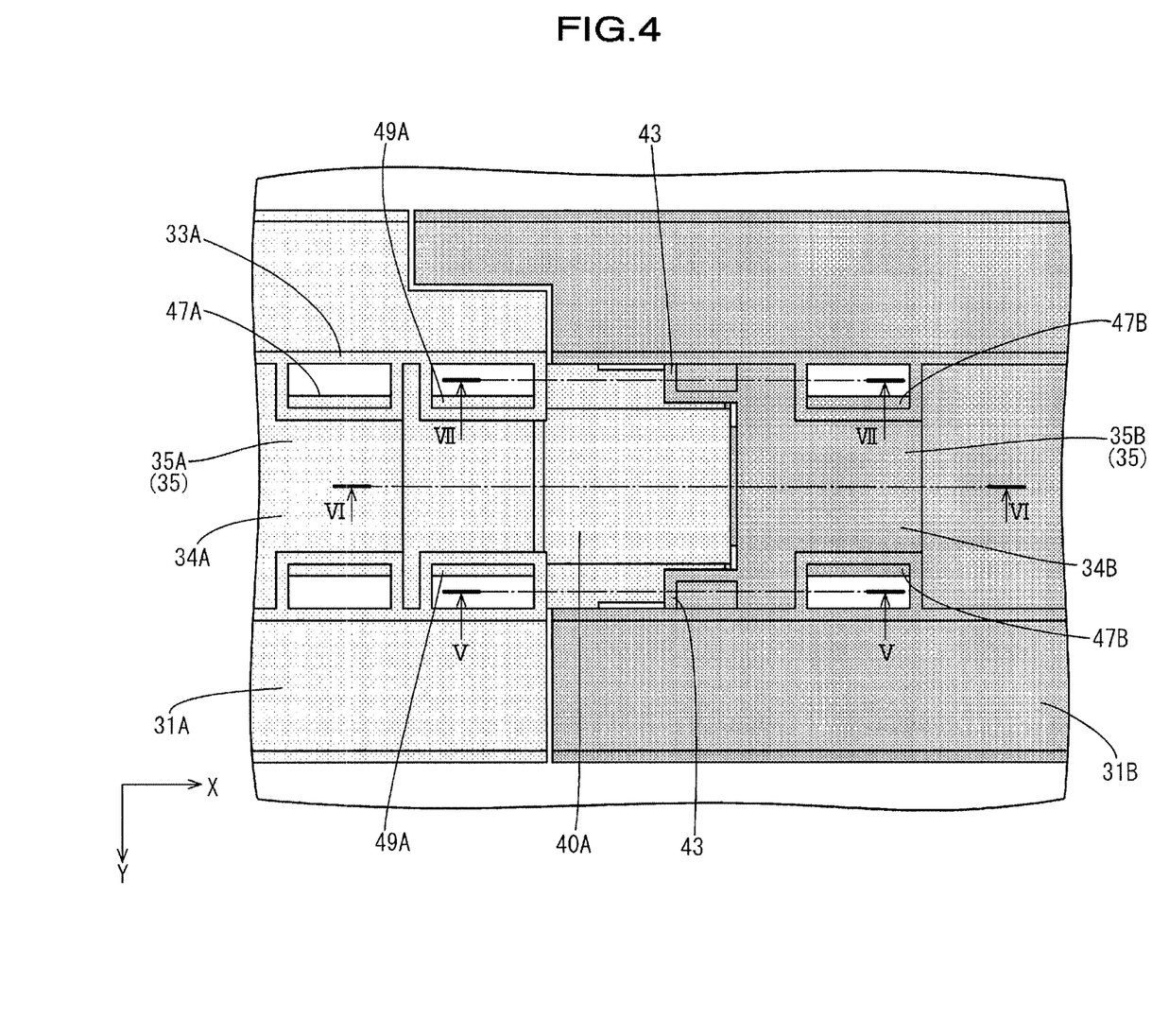
FIG. 4 is a partially enlarged view of FIG. 2.

As shown in FIG. 3, a left engagement portion 40A (an example of an engagement portion) protruding rightward is provided on the right end portion of the left bottom wall 34A (the end portion on the center coupling unit 31B side). The left engagement portion 40A has a substantially rectangular shape when viewed from above. A hook portion 41A protruding downward is formed on the lower surface of the left engagement portion 40A.

As shown in FIG. 3, a center engagement receiving portion 42B (an example of an engagement receiving portion) protruding leftward is provided on the left end portion of the center bottom wall 34B (the end portion on the left coupling unit 31A side). When viewed from above, the center engagement receiving portion 42B has a substantially rectangular shape slightly smaller than the left engagement portion 40A. A hook portion 41B that protrudes upward and engages with the hook portion 41A provided on the left engagement portion 40A is provided on the upper surface of the center engagement receiving portion 42B.

Figure 5:
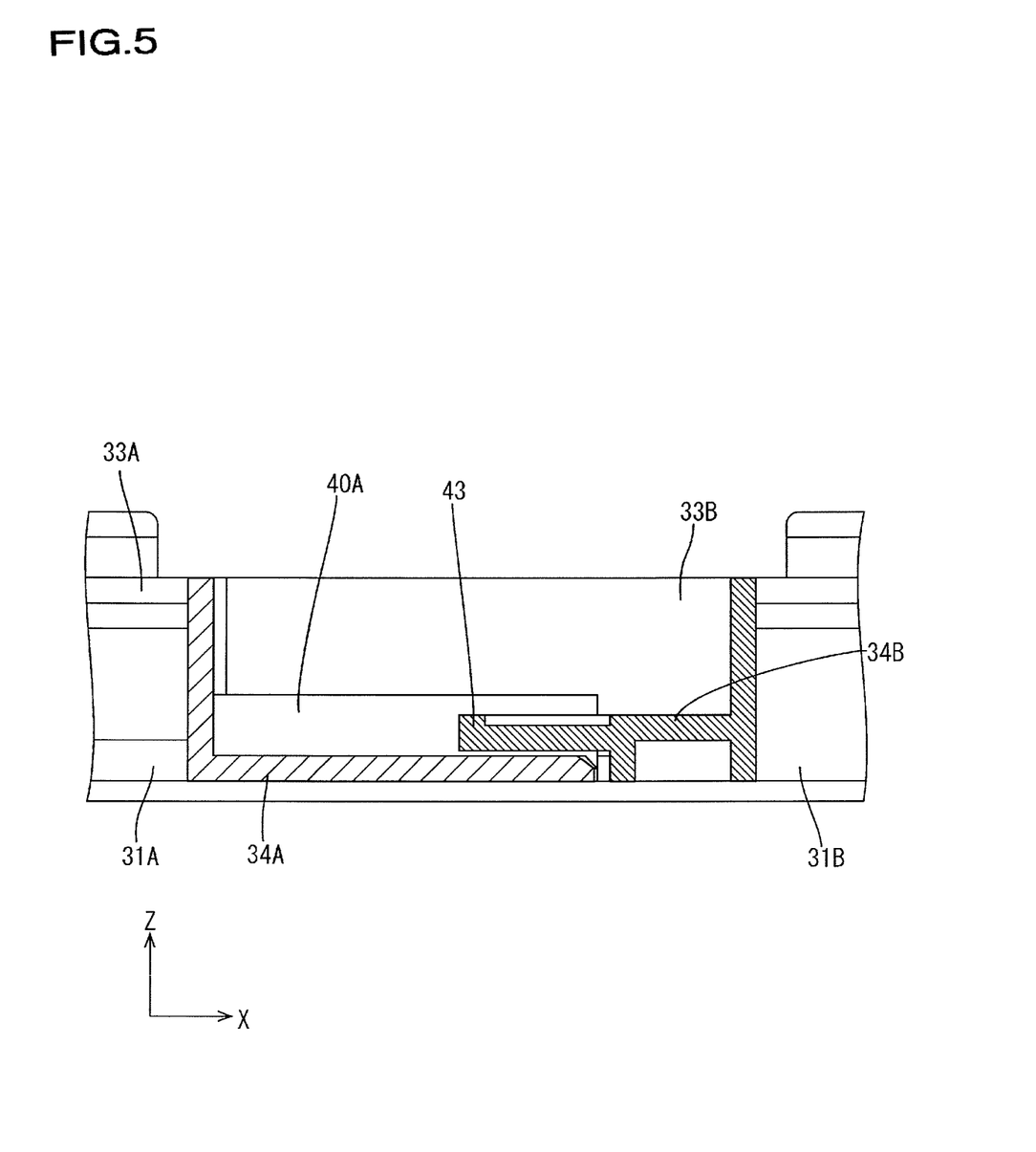
FIG. 5 is a cross-sectional view taken along the V-V line in FIG. 4.
Figure 7:
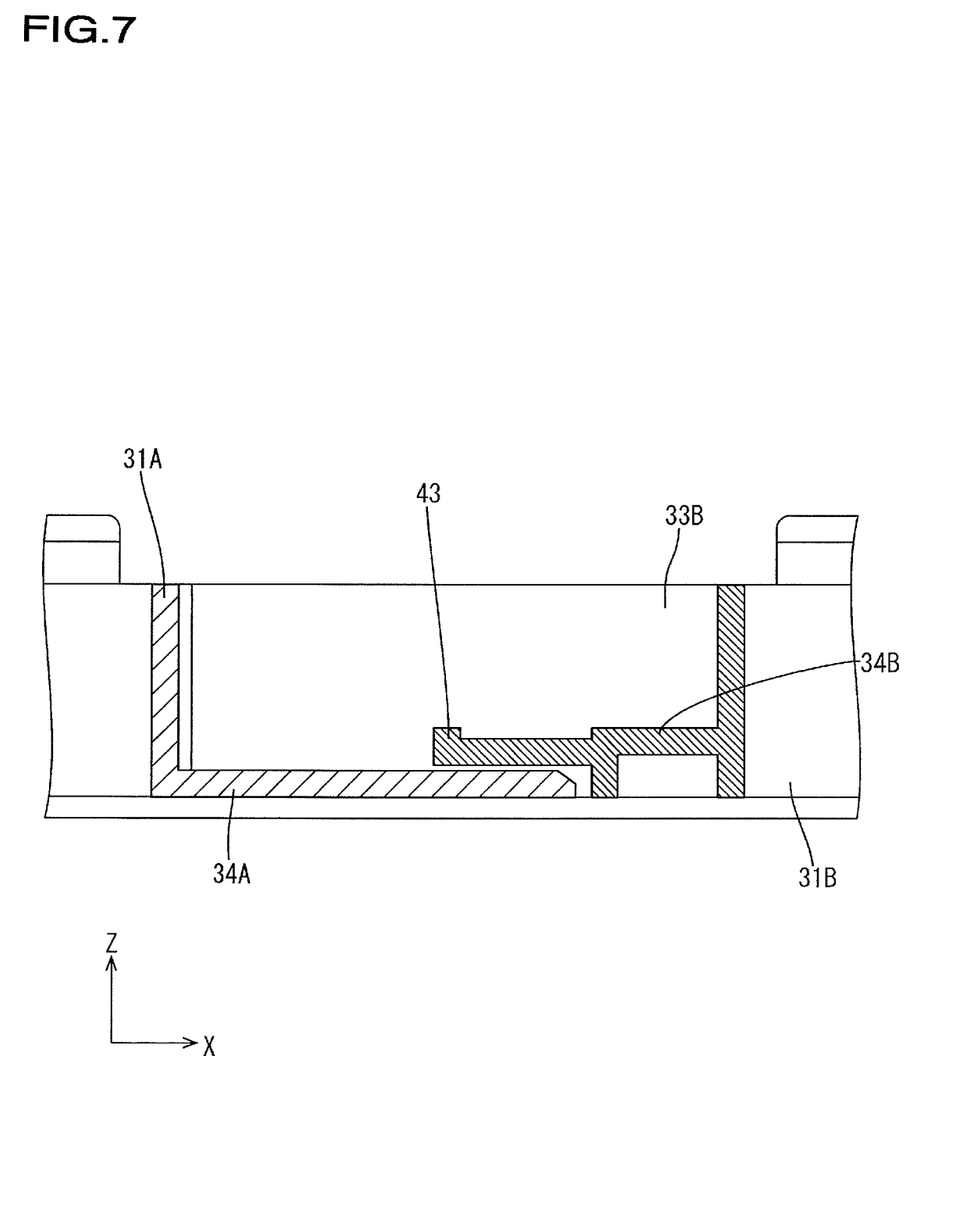
FIG. 7 is a cross-sectional view taken along the VII-VII line in FIG. 4.
Figure 8:
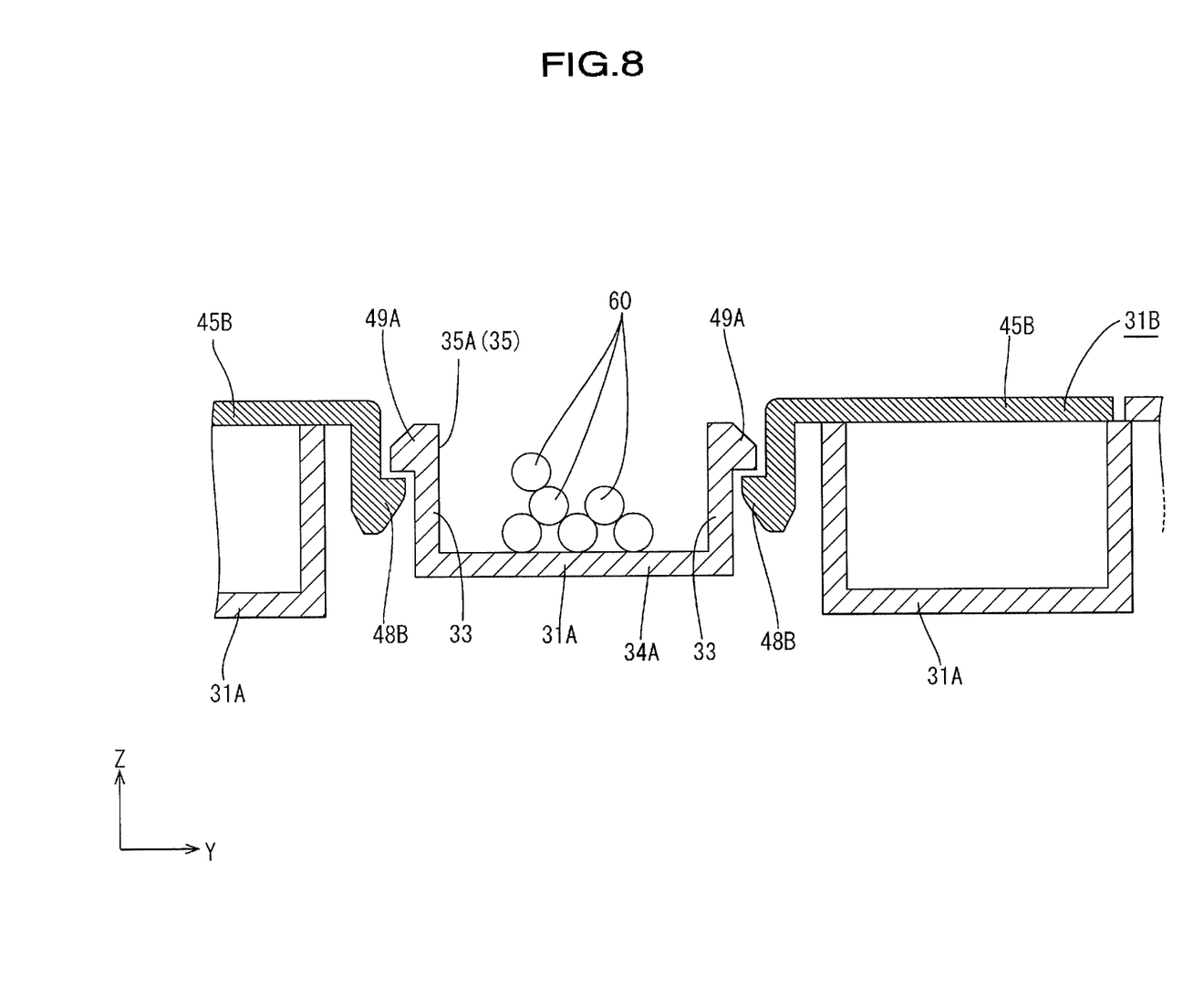
FIG. 8 is a cross-sectional view taken along the VIII-VIII line in FIG. 1.

As shown in FIGS. 5 and 7, overlapping portions 43 that overlap with the left engagement portion 40A from above are respectively formed at the front portion and the rear portion of the left end portion of the center bottom wall 34B. Each overlapping portion 43 has a substantially rectangular shape when viewed from above. The vicinity of the center of the overlapping portion 43 bulges downward so as to reliably overlap with the upper surface of the left engagement portion 40A.

In the state where the left coupling unit 31A and the center coupling unit 31B are coupled, the left engagement portion 40A and the center engagement receiving portion 42B overlap in the thickness direction (vertical direction) of the left bottom wall 34A and the center bottom wall 34B. Also, as mentioned above, the overlapping portions 43 of the center coupling unit 31B respectively overlap with the front and rear end portions of the right end portion of the left engagement portion 40A from above.

Figure 6:
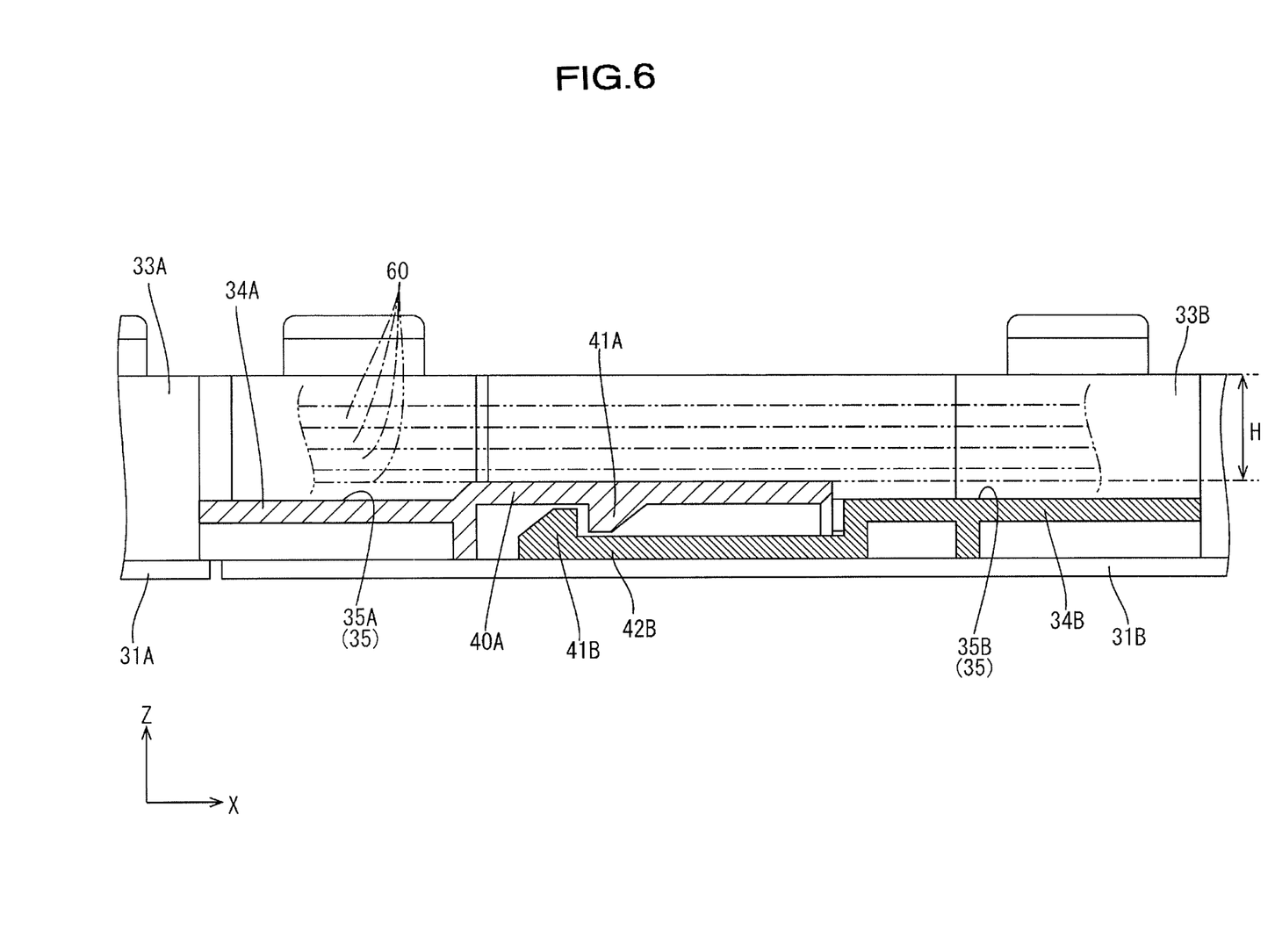
FIG. 6 is a cross-sectional view taken along the VI-VI line in FIG. 4.

As shown in FIG. 6, the hook portion 41A of the left engagement portion 40A engages with the hook portion 41B of the center engagement receiving portion 42B from the right side. In this manner, the left coupling unit 31A and the center coupling unit 31B are prevented from coming off in the left-right direction. Also, because the overlapping portions 43 overlap with the left engagement portion 40A from above, disengagement of the hook portion 41A of the left engagement portion 40A and the hook portion 41B of the center engagement receiving portion 42B can be suppressed.

As shown in FIG. 6, the left engagement portion 40A is formed to extend substantially in parallel to the left bottom wall 34A. The center engagement receiving portion 42B is formed to extend substantially in parallel to the center bottom wall 34B. In this manner, an increase in the thickness dimension in the vertical direction in the state where the left engagement portion 40A and the center engagement receiving portion 42B are engaged is suppressed.

In the state where the left coupling unit 31A and the center coupling unit 31B are coupled, the height position of the upper end portion of the side walls 33A of the left coupling unit 31A and the height position of the upper end portion of the side walls 33B of the center coupling unit 31B are aligned to be substantially the same.

The plurality of electric wires 60 are routed within a region in which the left bottom wall 34A, the left engagement portion 40A, and the center bottom wall 34B are the lower edge portion and the upper end edges of the side walls 33A and the side walls 33B are the upper edge portion. In FIG. 6, the plurality of electric wires 60 are routed within the range of the height dimension H in the vertical direction.

As shown in FIG. 2, left covers 45A (an example of a first cover) are respectively provided, via left hinge portions 44A (an example of a first hinge portion), at the front edge portion and the rear edge portion of the left coupling unit 31A, so as to be pivotable about the left hinge portions 44A. In each left cover 45A, a plurality of left cover lock portions 46A are provided with a space therebetween in the left-right direction at the end edge on the opposite side to the left hinge portion 44A. The left cover lock portions 46A respectively elastically engage with left cover lock receiving portions 47A provided within the region of the left routing portion in which the electric wires 60 are routed. By engaging the left cover lock portions 46A and the left cover lock receiving portions 47A, the left covers 45A close the holding portions 32 of the left coupling unit 31A from above.

As shown in FIG. 2, center covers 45B (an example of a second cover) are respectively provided, via center hinge portions 44B (an example of a second hinge portion), at the front edge portion and the rear edge portion of the center coupling unit 31B, so as to be pivotable about the center hinge portions 44B. In each center cover 45A, a plurality of center cover lock portions 46B are provided with a space therebetween in the left-right direction at the end edge on the opposite side to the center hinge portion 44B. The center cover lock portions 46B respectively elastically engage with center cover lock receiving portions 47B provided within the region of the center routing portion in which the electric wires 60 are routed. By engaging the center cover lock portions 46B and the center cover lock receiving portions 47B, the center covers 45A close the holding portions 32 of the center coupling unit 31B from above.

In each of the left end portions of the center covers 45B respectively provided on the front edge portion and rear edge portion of the center coupling unit 31B, a center unit lock portion 48B (an example of a unit lock portion) is provided. By the center unit lock portions 48B respectively elastically engaging with the left unit lock receiving portions 49A (an example of a lock receiving portion) provided within the region in which the electric wires 60 are routed of the right edge portion of the left routing portion 35A of the left coupling unit 31A, the left coupling unit 31A and the center coupling unit 31B are coupled (see FIG. 8).

Center coupling unit 31B and right coupling unit 31C

The right coupling unit 31C is formed symmetrically with the left coupling unit 31A. For this reason, in the above description regarding the left coupling unit 31A and the center coupling unit 31B, by replacing "left" with "right" and "right" with "left" for the description concerning the direction and replacing "A" with "C" for the reference numerals, it is possible to describe the configuration of the center coupling unit 31B and the right coupling unit 31C. Accordingly, descriptions of the configurations of the center coupling unit 31B and the right coupling unit 31C will be omitted. Note that, in the drawings, reference numerals are given to the members related to the right coupling unit 31C are donated by reference numerals in accordance with the above rule.

Actions and Effects of the Embodiment

Next, actions and effects of the present embodiment will be described. A wiring module according to the present embodiment is a wiring module 20 that is attached to the plurality of power storage elements 12 that are arranged side-by-side. The wiring module 20 includes the plurality of electric wires 60 and the plurality of coupling units 31 in which the plurality of electric wires 60 are routed. The left coupling unit 31A of the plurality of coupling units 31 has a left routing portion 35A in which at least one of the plurality of electric wires 60 is routed, and the center coupling unit 31B adjacent to the left coupling unit 31A of the plurality of coupling units 31 has a center routing portion 35B in which at least one of the plurality of electric wires 60 is routed. The left routing portion 35A is provided with a left engagement portion 40A and the center routing portion 35B is provided with a center engagement receiving portion 42B that engages with the left engagement portion 40A. The plurality of coupling units 31 are coupled in a state where the left engagement portion 40A and the center engagement receiving portion 42B are engaged with each other.

According to the present embodiment, because the left engagement portion 40A and the center engagement receiving portion 42B for coupling the left coupling unit 31A and the center coupling unit 31B are respectively provided on the left routing portion 35A and the center routing portion 35B, the routing space of the electric wires 60 in the wiring module 20 can be sufficiently secured, compared to the case where an engagement portion and an engagement receiving portion are provided at positions that are different from the position of the routing portion 35.

Also, in the present embodiment, the left routing portion 35A has a groove shape and has a left bottom wall 34A, and the left bottom wall 34A is provided with the left engagement portion 40A. The center routing portion 35B has a groove shape and has a center bottom wall 34B, and the center bottom wall 34B is provided with the center engagement receiving portion 42B. With this configuration, an increase in the height dimension in the vertical direction of the routing space of the electric wires 60 can be suppressed.

Also, according to the present embodiment, in the state where the left coupling unit 31A and the center coupling unit 31B are coupled, the left engagement portion 40A and the center engagement receiving portion 42B overlap in the thickness direction of the left bottom wall 34A and the center bottom wall 34B. With this configuration, an increase in the height dimension in the vertical direction of the routing space of the electric wires 60 can be further suppressed.

Also, according to the present embodiment, left covers 45A that cover the holding portions 32 provided on the left coupling unit are provided on the left coupling portion 31A via the left hinge portions 44A. Center covers 45B that cover the holding portions 32 provided on the center coupling unit 31B are provided on the center coupling unit 31B via the center hinge portions 44B. Center unit lock portions 48B are provided on the center cover 45B, and left unit lock receiving portions 49A that are engaged with the center unit lock portions 48B in a state where the center covers 45B cover the holding portions 32 are provided on the left coupling unit 31A.

With the above configuration, the left coupling unit 31A and the center coupling unit 31B can be double locked by the center cover 45B. As a result, the left coupling unit 31A and the center coupling unit 31B are reliably coupled.

Other Embodiments

The technique disclosed in the present specification is not limited to the embodiment disclosed through the description above and the drawings, and for example, the following embodiments are also encompassed in the technical scope of the technique disclosed in the present specification.

(1) In the present embodiment, the left engagement portion 40A is provided on the left bottom wall 34A and the center engagement receiving portion 42B is provided on the center bottom wall 34B, but the present invention is not limited thereto and a configuration is also possible in which an engagement portion is provided on the center bottom wall 34B and an engagement receiving portion is provided on the left bottom wall 34A.

(2) In the present embodiment, the left engagement portion 40A is provided on the left bottom wall 34A and the center engagement receiving portion 42B is provided on the center bottom wall 34B, but the present invention is not limited thereto. A configuration is also possible in which an engagement portion is provided on the side wall 33A and an engagement receiving portion 33B are provided on the side wall 33B, or in which an engagement portion is provided on the side wall 33B and an engagement receiving portion is provided on the side wall 33A.

(3) In the present embodiment, a configuration is adopted in which the holding portions 32 of the left coupling unit 31A are covered with the left covers 45A and the holding portions 32 of the center coupling unit 31B are covered with the center covers 45B, but the present invention is not limited thereto, and the left covers 45A and the center covers 45B may be omitted. Also, a configuration is possible in which the routing portions 35 are covered with the left covers 45A and the center covers 45B. Also, a configuration is possible in which the routing portions 35 are covered by attaching a separate cover to the wiring module 20.

(4) In the present embodiment, the configuration is adopted in which three coupling units 31, namely, the left coupling unit 31A, the center coupling unit 31B, and the right coupling unit 31C, are coupled, but the present invention is not limited thereto. A configuration is also possible in which two coupling units 31 are coupled, or a configuration is also possible in which four or more coupling units 31 are coupled. Among the plurality of coupling units, two coupling units adjacent to each other can be taken as a first unit and a second unit.

(5) In the present embodiment, a configuration is adopted in which the plurality of power storage elements 12 are connected in series, but the present invention is not limited thereto, and a configuration is also possible in which the plurality of power storage elements are connected in parallel.

(6) In the present embodiment, a rechargeable battery is used for the power storage element 12, but the present invention is not limited thereto, and a capacitor may be used.

LIST OF REFERENCE NUMERALS

12 Power storage element
20 Wiring module
31A Left coupling unit
31B Center coupling unit
31C Right coupling unit
34A Left bottom wall
34B Center bottom wall
34C Right bottom wall
35A Left routing portion
35B Center routing portion
35C Right routing portion
40A Left engagement portion
42B Center engagement receiving portion
44A Left hinge portion
44B Center hinge portion
44C Right hinge portion
45A Left cover
45B Center cover
45C Right cover
48B Center unit lock portion
49A Left unit lock receiving portion
60 Electric wire

The invention claimed is:

1. A wiring module configured to be attached to a plurality of power storage elements that are arranged side-by-side, the wiring module comprising:
a plurality of electric wires; and
a plurality of coupling units in which the plurality of electric wires are routed,
wherein a first coupling unit of the plurality of coupling units has a first routing portion in which at least one of the plurality of electric wires is routed,
a second coupling unit of the plurality of coupling units has a second routing portion in which at least one of the plurality of electric wires is routed, the second coupling unit being adjacent to the first coupling unit in a direction in which the first routing portion and the second routing portion extend,
an engagement portion is provided on one of the first routing portion and the second routing portion, and an engagement receiving portion that engages with the engagement portion is provided on the other of the first routing portion and the second routing portion,
the plurality of coupling units are coupled in a condition in which the engagement portion and the engagement receiving portion are engaged with each other,
the first routing portion has a groove shape and has a first bottom wall, and one of the engagement portion and the engagement receiving portion is provided on the first bottom wall,
the second routing portion has a groove shape and has a second bottom wall, and the other of the engagement portion and the engagement receiving portion is provided on the second bottom wall,
the engagement portion and the engagement receiving portion overlap in the thickness direction of the first bottom wall and the second bottom wall in a condition in which the first coupling unit and the second coupling unit are coupled,
a hook portion that is provided on the engagement portion and protrudes toward the engagement receiving portion and a hook portion that is provided on the engagement receiving portion and protrudes toward the engagement portion are engaged at a position not exposed to the first routing portion and the second routing portion,
a first cover that covers a first opening portion provided in the first coupling unit is provided on the first coupling unit via a first hinge portion,
a second cover that covers a second opening portion provided in the second coupling unit is provided on the second coupling unit via a second hinge portion,
a unit lock portion is provided on the second cover of the second coupling unit, and
a unit lock receiving portion, which engages with the unit lock portion on the second cover of the second coupling unit in a condition in which the second cover covers the second opening portion, is provided on a portion of the first coupling unit that is different from the first cover and the first hinge portion.

2. The wiring module according to claim 1, wherein the unit lock receiving portion is provided on an inner surface of a side wall of the first routing portion of the first coupling unit.

3. The wiring module according to claim 1, wherein the unit lock receiving portion is provided at an end of the first routing portion adjacent to the second routing portion of the second coupling unit.

4. The wiring module according to claim 1, wherein the unit lock portion is provided on an edge of the second cover opposite to an edge where the second hinge portion is provided and at an end of the second cover adjacent to the first cover in a direction in which the second routing portion extends.

5. A wiring module configured to be attached to a plurality of power storage elements that are arranged side-by-side, the wiring module comprising:
a plurality of electric wires; and
a plurality of coupling units in which the plurality of electric wires are routed,
wherein a first coupling unit of the plurality of coupling units has a first routing portion in which at least one of the plurality of electric wires is routed,
a second coupling unit of the plurality of coupling units has a second routing portion in which at least one of the plurality of electric wires is routed, the second coupling unit being adjacent to the first coupling unit in a direction in which the first routing portion and the second routing portion extend,
an engagement portion is provided on one of the first routing portion and the second routing portion, and an engagement receiving portion that engages with the engagement portion is provided on the other of the first routing portion and the second routing portion,
the plurality of coupling units are coupled in a condition in which the engagement portion and the engagement receiving portion are engaged with each other, the first routing portion has a groove shape and has a first bottom wall, and one of the engagement portion and the engagement receiving portion is provided on the first bottom wall, the second routing portion has a groove shape and has a second bottom wall, and the other of the engagement portion and the engagement receiving portion is provided on the second bottom wall, the engagement portion and the engagement receiving portion overlap in the thickness direction of the first bottom wall and the second bottom wall in a condition in which the first coupling unit and the second coupling unit are coupled, a hook portion that is provided on the engagement portion and protrudes toward the engagement receiving portion and a hook portion that is provided on the engagement receiving portion and protrudes toward the engagement portion are engaged at a position not exposed to the first routing portion and the second routing portion, a first cover that covers a first opening portion provided in the first coupling unit is provided on the first coupling unit via a first hinge portion, a second cover that covers a second opening portion provided in the second coupling unit is provided on the second coupling unit via a second hinge portion, a unit lock portion is provided on the first cover of the first coupling unit, and a unit lock receiving portion, which engages with the unit lock portion on the first cover of the first coupling unit in a condition in which the first cover covers the first opening portion, is provided on a portion of the second coupling unit that is different from the second cover and the second hinge portion.

6. The wiring module according to claim 5, wherein the unit lock receiving portion is provided on an inner surface of a side wall of the second routing portion of the second coupling unit.

7. The wiring module according to claim 5, wherein the unit lock receiving portion is provided at an end of the second routing portion adjacent to the first routing portion of the first coupling unit.

8. The wiring module according to claim 5, wherein the unit lock portion is provided on an edge of the first cover opposite to an edge where the first hinge portion is provided and at an end of the first cover adjacent to the second cover in a direction in which the first routing portion extends.

* * * * *